(12) United States Patent
Chen et al.

(10) Patent No.: US 8,289,396 B2
(45) Date of Patent: Oct. 16, 2012

(54) WIRELESS DATA TRANSMITTING METHOD

(75) Inventors: Yu-Lin Chen, Taipei Hsien (TW);
Chen-Wei Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 677 days.

(21) Appl. No.: 12/488,519

(22) Filed: Jun. 20, 2009

(65) Prior Publication Data

US 2009/0322900 A1 Dec. 31, 2009

(30) Foreign Application Priority Data

Jun. 27, 2008 (CN) .......................... 2008 1 0302383

(51) Int. Cl.
*H04N 17/02* (2006.01)
(52) U.S. Cl. ....................... 348/177; 348/187; 348/223.1
(58) Field of Classification Search .......... 348/175–179, 348/187–188
See application file for complete search history.

(56) References Cited

U.S. PATENT DOCUMENTS

| | | | | |
|---|---|---|---|---|
| 5,351,201 | A | * | 9/1994 | Harshbarger et al. .......... 348/187 |
| 6,798,446 | B2 | * | 9/2004 | Maggi ....................... 348/207.99 |
| 7,733,404 | B2 | * | 6/2010 | Zandifar et al. ......... 348/333.01 |
| 2002/0027608 | A1 | * | 3/2002 | Johnson et al. ................ 348/383 |
| 2006/0098096 | A1 | * | 5/2006 | Gupta et al. ................... 348/188 |
| 2008/0094474 | A1 | * | 4/2008 | Pierce ............................ 348/188 |
| 2009/0021587 | A1 | * | 1/2009 | Snyderman et al. ..... 348/207.11 |
| 2009/0273679 | A1 | * | 11/2009 | Gere et al. ..................... 348/187 |

* cited by examiner

*Primary Examiner* — Vivek Srivastava
*Assistant Examiner* — Junior Mendoza
(74) *Attorney, Agent, or Firm* — Altis Law Group, Inc.

(57) ABSTRACT

A wireless data transmitted method is disclosed. Firstly, a carrier block is displayed. Then, color of the displayed carrier block is modulated in accordance with data to be transmitted. The data is transmitted by capturing an image of the displayed carrier block. The captured carrier block is recognized and the color thereof is calibrated. Finally, the transmitted data is obtained by demodulating the color of the captured carrier block.

3 Claims, 2 Drawing Sheets

WIRELESS DATA TRANSMITTING METHOD

BACKGROUND

1. Technical Field

The present disclosure relates to data transmitting methods and, particularly, to a wireless data transmitting method.

2. Description of Related Art

At present, many wireless data transmitting methods have been developed to wirelessly transmit a data stream between electronic devices. In these wireless data transmitting methods, the data stream is typically carried by electromagnetic waves and then wirelessly transmitted using the electromagnetic waves between the electronic devices. However, during transmission, the electromagnetic waves may encounter interference produced by external electromagnetic fields, thereby decreasing the transmission quality.

Therefore, it is desirable to provide a wireless data transmitting method, which can overcome the above-mentioned problems.

DETAILED DESCRIPTION

Figure 1:
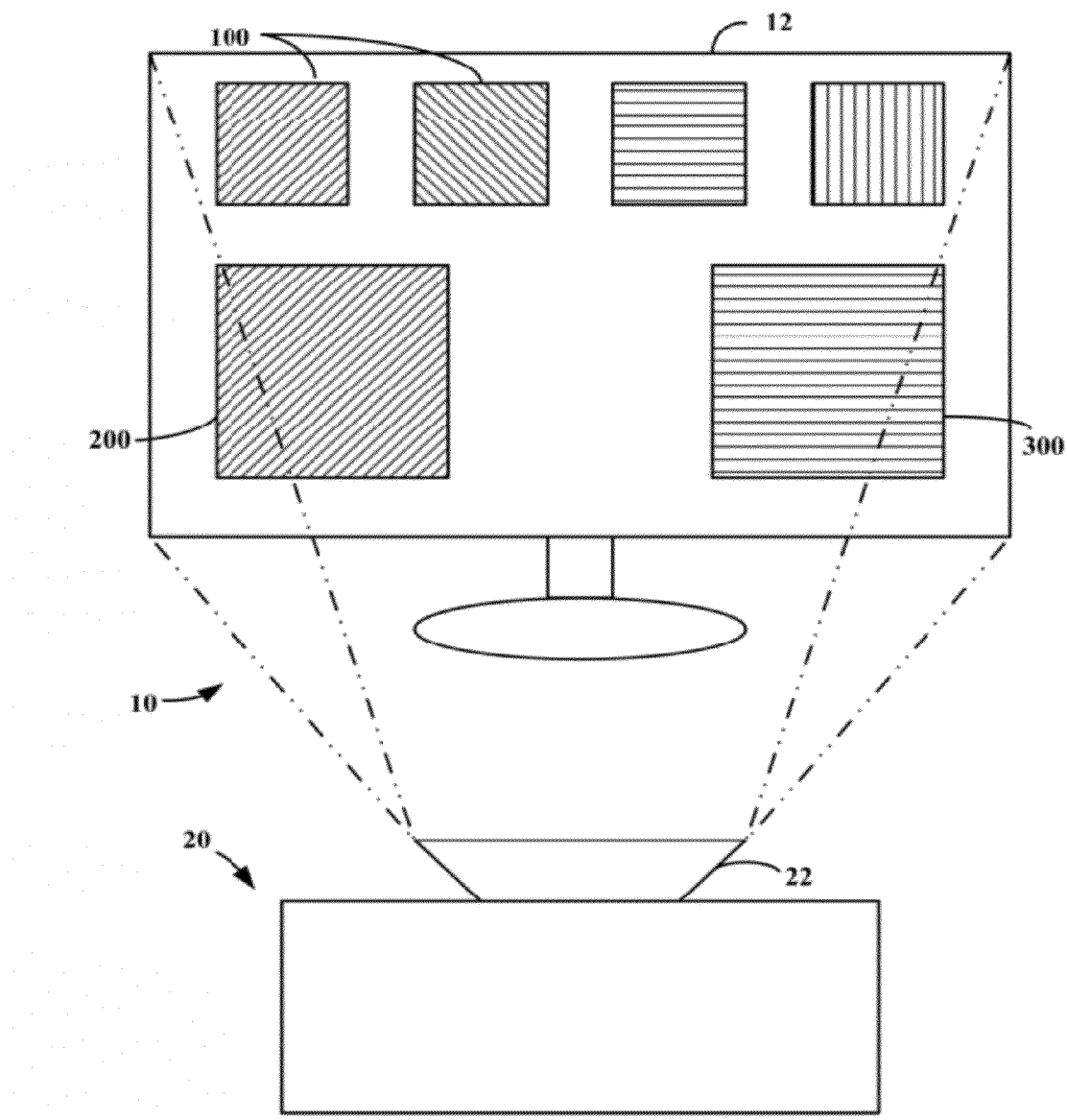
FIG. 1 is a schematic view showing a system to which a wireless data transmitting method is applied, according to an exemplary embodiment.

Referring to FIG. 1, a wireless data transmitting method, according to an exemplary embodiment, is used for transmitting a data stream from a first electronic device 10 to a second electronic device 20. The first electronic device 10 can be a computer or any other electronic devices having a relative large screen 12. The second electronic device 20 can be a digital still camera (DSC) or any other device having a camera module 22.

Figure 2:
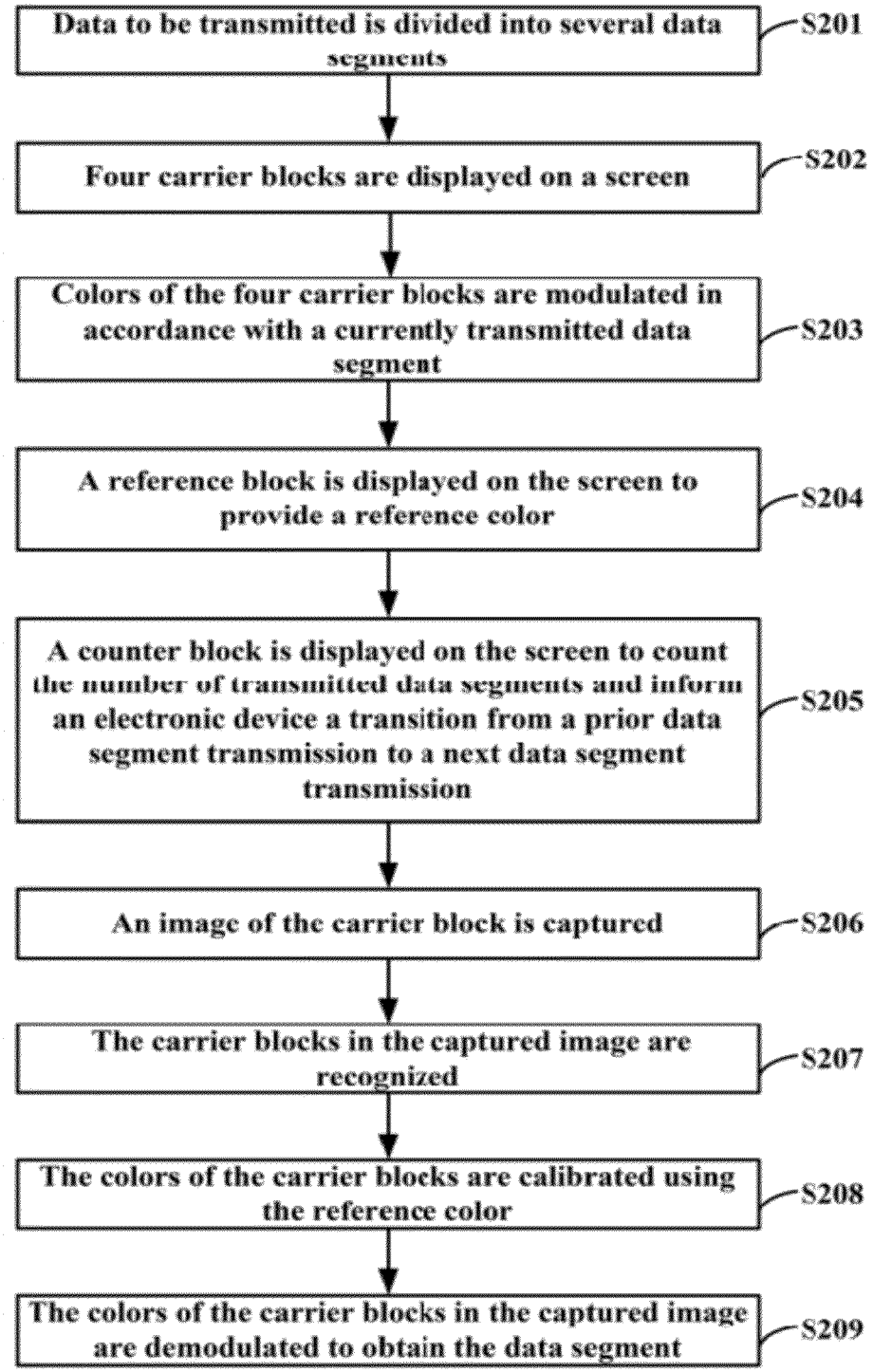
FIG. 2 is a flowchart of the wireless data transmitting method, according to the exemplary embodiment.

Also referring to FIG. 2, a wireless data transmitting method, according to an exemplary embodiment, is disclosed. The wireless data transmitting method includes the following steps S201-S209.

In step S201, data to be transmitted is divided into several data segments, e.g., 4-byte data segments. Commonly, the wireless data transmitting method may only can transmit one data segment at one time (see below), but the data is larger than one data segment. Therefore, before transmission, the data need to be divided into data segments. However, it should be understood that, in other alternative embodiments, if the data is not larger than one data segment, this step can be omitted. This step can be performed by the first electronic device 10. In particular, in addition to the screen 12, the first electronic device 10 includes a segmenting unit (not shown) for segmenting the data.

In step S202, four carrier blocks 100 are displayed on the screen 12. The four carrier blocks 100 are essentially similar in shape and size and are displayed in a line with a uniform distance at the top portion of the screen 12. This step is performed by the first electronic device 10. In detail, the first electronic device 10 includes a display driver (not shown). The four carrier blocks 100 are displayed by the display driver.

In Step S203, color of the four carrier blocks 100 on the screen 12 are modulated in accordance with a currently transmitted data segment. Commonly, if each of the carrier blocks 100 has about 256 colors (i.e., 8-bit color), then each carrier block 100 can carry a byte of data. That is, the total of four carrier blocks 100 can carry the 4-byte data segment at one time. This step can be implemented by the first electronic device 10. In particular, the first electronic device 10 includes a modulator for modulating the colors of the carrier blocks 100 in accordance with the currently transmitting data segment. For example, the modulator reads a current data segment "00000001 00000011 00000111 00001111" and accordingly modulates the colors of the four carrier blocks 100, from left to right, into colors: 1, 3, 7, 15 (color values).

It should be understood that the number of the carrier blocks 100 and/or the number of colors of each carrier bock 100 is not limited to this embodiment, but can be determined based upon specifications of the first electronic device 10 and requirements of transmitting rate of the wireless data transmitting method. For example, in other alternative embodiments, only one carrier block 100 having two colors can be used. Also, shapes, sizes, and/or positions of the four carrier blocks 100 are not limited to this embodiment.

In step S204, a reference block 200 is displayed on the screen 12. In particular, the reference block 200 is displayed on a left-bottom portion of the screen 12. The size of the reference block 200 is larger than that of the carrier blocks 100. The reference block 200 is configured for providing a reference color (see below). This step also can be carried out by the display driver.

In step S205, a counter block 300 is displayed on the screen 12. In detail, the counter block 300 is displayed on a right-bottom portion of the screen 12. The size of the counter block 300 is essentially similar with the reference block 200. Color of the counter block 300 is modulated in accordance with the number of the transmitted data segments. Also, the counter block 300 is configured for informing the second electronic device 20 a transition from a prior data segment transmission to a next data segment transmission. For example, when the colors of the four carrier blocks 100 are changed to carry the $100^{th}$ data segment, the color of the counter block 300 is switched from "01100011" to "01100100".

It should be understood that, the number of the counter block 300 is not limited to this embodiment but can be more if needed. Also, the step S205 can be omitted if the data is not larger than one data segment. In addition, shapes, sizes, and/or positions of the reference block 200 and the counter block 300 are not limited to this embodiment.

In step S206, an image of the screen 12 is captured by the camera module 22. In practice, to capture a clear image, the second electronic device 20 is placed in front of the screen 12 with the camera module 22 pointing to the screen 12 and in a position to discern the blocks. It should be mentioned that, for continuously transmitting the data segments, the camera module 22 must capture continuously, that is, operate in a DSC continuous mode.

In step S207, the carrier blocks 100 in the captured image are recognized. This step can be carried by the second electronic device 20. In detail, many recognition algorithms including nerve network, nerve network plus fast Fourier transform, fuzzy plus nerve network, RGB normalized color, fuzzy color, principle component analysis, and algorithm template, can be used by the second electronic device 20.

In step S208, the colors of the carrier blocks 100 in the captured image are calibrated using the reference color. This can be performed in the second electronic device 20. Since each of the first electronic device 10 and the second electronic device 20 has a unique color signature and also the colors of the carrier blocks 100 in the captured image are greatly affected by external factors, e.g., ambient light. Therefore, the second electronic device 20 may distort the colors of the carrier blocks 100 designated by the first electronic device 10. Therefore, it is needed to calibrate the colors of the carrier blocks 100 in the second electronic device 20.

In step S209, the color of the carrier blocks 100 in the captured image is demodulated. Thereby, the transmitted data segment is extracted. This is carried out in the second electronic device 20.

While various exemplary and preferred embodiments have been described, it is to be understood that the invention is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A wireless data transmitting method for transmitting data stream from a first electronic device, which comprises a screen, to a second electronic device, which comprises a camera module, the wireless data transmitting method comprising:

displaying four carrier blocks on the screen;

dividing data to be transmitted into a plurality of data segments each of which is capable of being carried by the four carrier blocks and transmitted at one time modulating colors of the four carrier blocks on the screen such that each carrier block carries a binary data to which the color of the carrier block is designated;

capturing an image of the carrier blocks using the camera module;

recognizing the carrier blocks in the captured image;

calibrating the colors of the carrier blocks in the captured image using the second electronic device; and demodulating the colors of the carrier blocks in the captured image to obtain the binary data carried by each carrier block, using the second electronic device; and displaying a counter block on the screen, the color of the counter block being modulated in accordance with the number of transmitted data segments, and being configured for informing the second electronic device a transition from a prior data segment transmission to a next data segment transmission.

2. The wireless data transmitting method of claim 1, wherein the counter block is displayed on a right-bottom portion of the screen.

3. The wireless data transmitting method of claim 1, the size of the counter block is larger than that of the carrier blocks.

* * * * *